United States Patent [19]

Harendza-Harinxma

[11] 4,111,800

[45] * Sep. 5, 1978

[54] PROCESS FOR TREATING MUNICIPAL SOLID WASTE AND RAW SEWAGE SLUDGE

[76] Inventor: Alfred J. Harendza-Harinxma, 50 Merion Pl., Lawrenceville, N.J. 08648

[*] Notice: The portion of the term of this patent subsequent to Jun. 1, 1993, has been disclaimed.

[21] Appl. No.: 729,890

[22] Filed: Oct. 6, 1976

[51] Int. Cl.² .................... C02C 3/00; C01B 31/00
[52] U.S. Cl. ..................................... 210/10; 110/342; 110/346; 201/25; 210/18; 210/39; 210/67; 210/73 S; 252/425; 423/449; 423/453; 423/461
[58] Field of Search ................ 110/7 R, 8 R; 201/25; 210/10, 18, 42, 56, 63, 66–68, 73 SG, 39, 40; 252/421, 425, 444; 423/415 R, 449, 453, 461

[56] References Cited

U.S. PATENT DOCUMENTS

| | | | |
|---|---|---|---|
| 1,915,240 | 6/1933 | Putnam | 210/67 |
| 1,937,481 | 11/1933 | Raisch et al. | 210/67 |
| 3,377,272 | 4/1968 | Cann | 210/10 |
| 3,638,590 | 2/1972 | Roberts et al. | 210/67 |
| 3,741,890 | 6/1973 | Smith et al. | 210/73 SG |
| 3,961,025 | 6/1976 | Harendza-Harinxma | 423/415 R |
| 4,010,098 | 3/1977 | Fassell | 210/73 SG |

FOREIGN PATENT DOCUMENTS 647,027  8/1964  Belgium .................................. 210/67

*Primary Examiner*—Charles N. Hart
*Assistant Examiner*—Peter A. Hruskoci

[57] ABSTRACT

Raw sewage sludge is combined with a solution of sodium aluminate. Municipal solid waste is then treated with the sludge-aluminate mixture. The treated waste is then carbonized in a furnace.

14 Claims, 2 Drawing Figures

PROCESS FOR TREATING MUNICIPAL SOLID WASTE AND RAW SEWAGE SLUDGE

BACKGROUND OF THE INVENTION

1. Field of the Invention

This invention relates to a method of carbonizing a substance comprising cellulose and more particularly, to a method of carbonizing cellulose-containing waste products with an alkali metal aluminate which has been dissolved in sewage sludge containing, typically, from 4-7% of solid material, e.g. faeces.

2. Description of the Prior Art

As is well known, the United States is a conglomerate of municipalities, the vast majority of which have populations below 100,000. These municipalities produce vast amounts of waste material which, in turn, dictates massive landfill or incineration programs. However, in most municipalities there is typically not enough waste to make it profitable to build electric power or chemical plants, adjacent to the municipal incinerator or sewage plant, to recover or recycle this waste material.

"Municipal solid waste" as that term is used herein will be understood as referring to raw refuse such as domestic rubbish and garbage of the type which is discarded within municipalities and handled by collection and disposal systems. It will be understood that although the term suggests only such waste as is collected by a municipality and/or treated by a municipality, the present invention is applicable to and includes such solid waste material whether or not a municipality has been involved in its collection or treatment.

Municipal solid waste although variable from time to time and from place to place has been analyzed to be of the following average composition:

| | |
|---|---|
| Paper, cardboard, etc. | 50-70% |
| Miscellaneous organics, such as plastics, wood, food products, etc. | 10-20% |
| Nonmetallic materials such as metallic oxides, glass earth ceramics, etc. | 10-20% |
| Ferrous metals such as iron and steel | 5-10% |
| Nonferrous metals such as copper, aluminum, zinc, etc. | 0.2-1% |

A technique whereby cellulose-containing materials can be completely carbonized or charred without leaving a residue, i.e., without incineration and formation of an ash, is disclosed in my U.S. Pat. No. 3,961,025 which issued on June 1, 1976, which patent is hereby incorporated by reference as if more fully set forth herein.

As disclosed in the above - referenced patent, my priorly patented method includes combining the cellulose-containing waste substance with an alkali metal aluminate to form a carbonizing mixture. The carbonizing mixture is then heated to carbonize the substance.

This process which operates in a closed system and is therefore pollution free, yields carbon/carbon dioxide and flammable distillation gases. Further, the alkali metal aluminate can be recovered and re-used.

However, solid waste per se is not the only problem facing today's small — municipalities. We must also consider the problem of sewage sludge. Because within the next decade, the amount of sludge that accumulates in the course of a year will have more than doubled. Only recently have we come to realise the danger that can arise if this sludge is dumped without treatment. For example, we now know that sewage sludge is a carrier of hepatitis viruses, salmonellae (which are carried inland from coastal dumps by seagulls, for example), benzopyrone in aerosol form and other polycyclic aromatic substances which are carcinogenic.

Even when sludge is disposed of in an approved manner, most of these harmful substances remain intact and represent a latent danger. Anthrax virus, for example, has been known to survive in total isolation for decades. Further, when fermentation starts, the interior of a refuse tip resembles a chemical factory because of the lack of air or oxygen in the tip. This danger does not even come to light until vegetation, small trees and the like, are planted on the man-made hillock. This vegetation soon withers and dies because its roots are unable to find nutrients, striking nothing but methane and sulphur dioxide.

I consider raw sewage sludge to have the following typical chemical composition:

| | |
|---|---|
| Total dry solids | 4.0% |
| Volatile solids | 59.0% |
| Protein | 20.0% |
| Cellulose | 10.0% |
| Nitrogen | 2.5% |
| Phosphorus ($P_2O_5$) | 1.6% |
| Potash ($K_2O$) | 0.4% |
| Iron (not as sulfide) | 2.5% |

The problem, then, is to devise a pollution-free process for safely disposing of both municipal solid waste and sewage sludge.

SUMMARY OF THE INVENTION

Fortunately, the above and other problems have been solved by the instant invention. More specifically, by using a modified version of the process disclosed in my recently issued U.S. Pat. No. 3,961,025 only one plant is necessary to carbonize both cellulose-containing solid waste and sewage sludge. Herein lies the greatest advantages of my new process.

Small municipalities may carbonize the waste material and sludge locally and ship the carbon, which will now be reduced to $1/20^{th}$ of the original waste volume, to a central plant. This plant could use the carbon for further chemical purposes, if desired. In the central plant, the catalyst and additional minerals contained in the cellulose-containing waste will be separated from the carbon.

In the process, to be described below, however, the carbonization occurs below the melting point of both glass and aluminum; thus, the separation of the latter materials can occur either before or after carbonization.

In larger communities, the metal-glass and cellulose-containing waste may be separated before dipping of cellulose-containing waste into a sewage sludge-sodium aluminate solution. In this case the capacity of the carbonizing furnace is increased considerably.

Smaller communities may separate the metal-glass from the carbonized cellulose waste after carbonization so that the separator has only from 15-25% of metal and glass to deal with. Or, the metal-glass residue may be sent to larger municipalities for separation.

The instant process, thus, makes it possible to build only the carbonizing units in the smaller communities. The raw material so obtained may be sent to a central plant to utilize the energy which is contained in the waste for further industrial purposes.

DESCRIPTION OF THE DRAWINGS

The present invention will be more readily understood by reference to the following drawings wherein.

DETAILED DESCRIPTION

The present invention has been described largely in terms of carbonizing cellulose-containing waste materials and sludge with sodium aluminate. However, it will be understood that such description is exemplary only and does not limit the subject invention. It will be readily appreciated that the invention concept described is equally applicable to aluminates selected from among other alkali metal aluminates such as Li, K, Rb, Cs, etc.

As previously discussed, to utilize the energy contained in cellulose-containing waste, my U.S. Pat. No. 3,961,025 discloses a process for carbonizing the waste in a rotary drum and for utilizing the products of carbon and flammable distillation gases so obtained as a source of energy for the production of gasoline or electric power.

The process is based on a water-soluble catalyst, such as sodium aluminate, which makes possible the carbonization of the waste material at temperatures as low as 250° C.

GENERAL OUTLINE OF THE MODIFIED PROCESS a. Municipal solid waste disposal is combined with municipal and industrial sewage disposal;
b. Sewage sludge, typically containing from 4–7% of solids is used as a solvent for the sodium aluminate catalyst;
c. The solution of sodium aluminate in sewage sludge is used for the treatment of municipal cellulose-containing solid waste; and
d. During the treatment, combined sludge and municipal solid waste filtered, dewatered and then carbonized.

Figure 1:
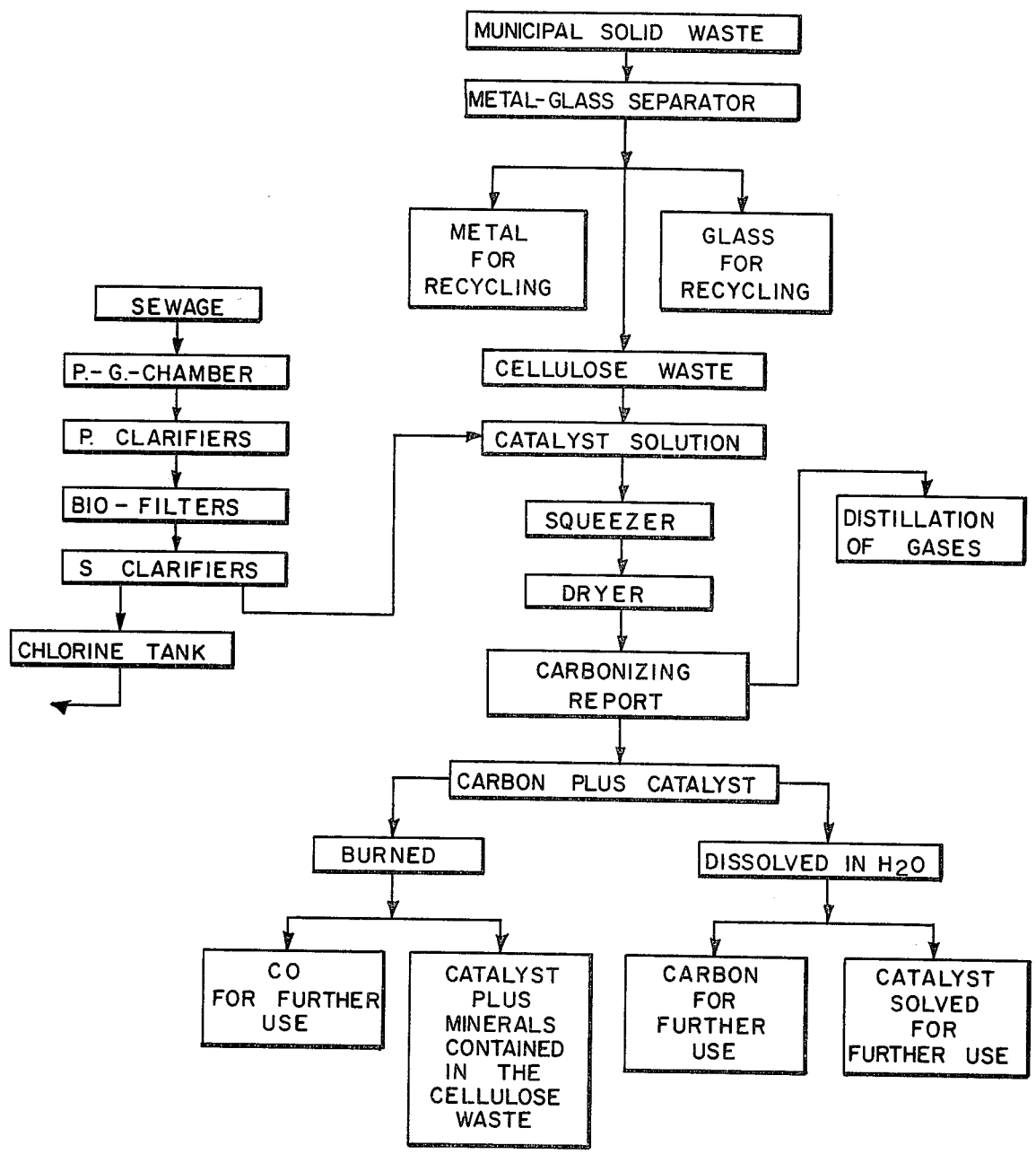
FIGS. 1 and 2 are general flow-charts of the novel process of the invention.
Figure 2:
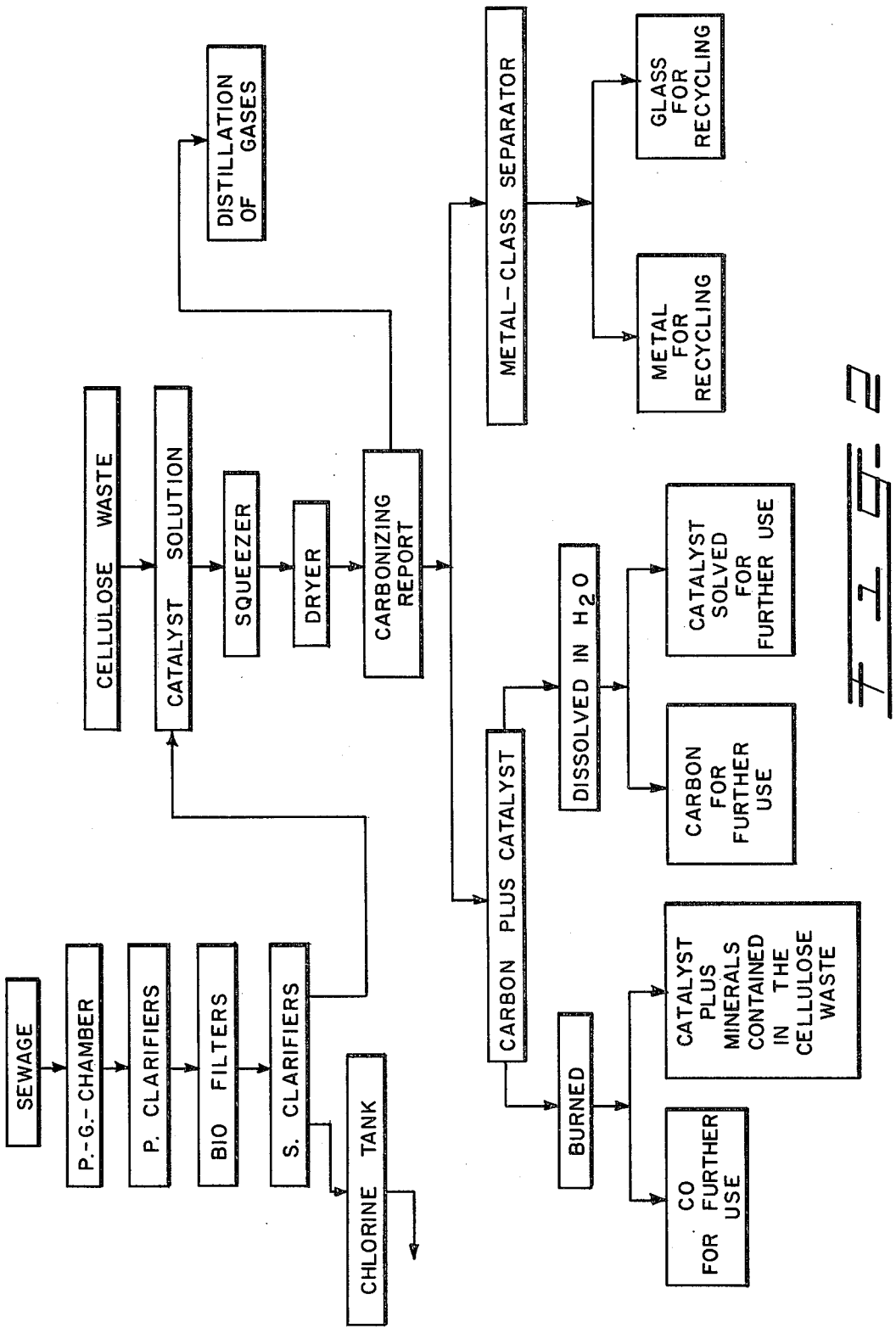

The process is explained more fully with the aid of the flow diagrams as follows: (FIGS. 1 and 2)

PREPARATION OF SEWAGE

In a screening chamber, the solids which are contained in the municipal and industrial raw sewage are cut-up to prevent damage to the pumps and to obtain better settling results for the solids.

Next, the cut-up raw sewage is pumped into a Parshall flume and grit chamber where any sand, grit or other abrasive particles which might pass through the pumps are removed. The Parshall flumes measure all of the raw municipal sewage flow. In the grit chamber, self-produced raw carbon obtained from priorly treated (carbonized) sewage sludge and cellulose-containing solid waste is added to the sewage. As used herein, the term raw carbon includes sodium aluminate with its compounds aluminum hydroxide and sodium hydroxide. Because of the turbulence of the process, the carbon is well distributed into the sewage. This (1) improves the settling of solids; and (2) reduces the odor of the sewage.

The sewage — carbon mixture is then flowed into the Primary Clarifiers. There, the solids and greases in the sewage are settled-out in the tanks. As is well known, polymers may be added to the sewage at this point to further improve the settling of solids.

The effluent from the Primary Clarifiers is directed into Bio-Filter and later into a Secondary Clarifier in which further settling of solids occurs. In the Bio-Filter the minute particles that do not settle in the primary clarifiers are filtered and oxidized by bacteria. These minute particles are then settleable. Also in the Secondary Clarifiers, the effluent is filtered through raw carbon filters and directed into a chlorine-contact tank. In the chlorine-contact tank, chlorine is applied to the treated sewage which is, thus, sterilized, thereby killing all bacteria present.

Finally, raw sewage sludge with an excess of 4.5% of solids is collected into a tank and a water soluble catalyst, such as sodium aluminate, is added thereto. The amount of sodium aluminate can varied from 1–20%.

The municipal, cellulose-containing solid waste is then treated with the sewage and carbonized in a rotary furnace, in the manner described in the above referenced U.S. Patent. Suitable catalysts for the carbonizing process include alkali metal aluminates.

PREPARATION OF THE MUNICIPAL SOLID WASTE (MSW)

When the cellulose-containing waste arrives at the processing site it is first chopped and thereafter prepared for carbonization in two ways:

A. The solid waste is directed into a metal and glass-cellulose waste separator. When the metals are removed, the glass-cellulose waste is directed into a rotary drum screen. Here the glass is removed. Through these two processing steps the municipal solid waste is reduced to about 75% of its weight. These two steps increase the capacity of the carbonizing furnace — FIG. 1. The remaining cellulose waste is fed into a rectangular basket comprised of a heavy duty screen. The basket is dipped into a container having prepared sewage sludge-sodium aluminate solution. The temperature of the solution is about 50° C. A stirrer rotates the waste in the solution so that every part of the garbage is soaked with the catalyst. The soaking time is about 15 minutes.

B. When the cellulose-containing municipal solid waste arrives at the processing site it is first chopped and thereafter fed into a rectangular basket comprised of a heavy duty screen — FIG. 2. The rest of the procedure is as described above.

It should be recognized, that as these two processing steps are only preparatory steps for the instant carbonizing process, they may be adjusted as desired to the individual requirements of existing plants or municipalities.

Next, the basket with cellulose-containing waste (or garbage) is pulled out of the container and by applying pressure, excess catalyst solution is removed therefrom. The dry, or partly dry, waste material is then fed into a heated screen drum of a heavy duty metal mesh material, inside of a metal drum. This screen drum is positioned at an angle of about 15° and rotates slowly so that the garbage which is fed to the elevated position of the drum moves slowly, through the rotation of the drum, in a helical path to the opposite end of the drum. During this process, the cellulose-containing waste is carbonized. The carbonized material thus produced is very brittle and easily pulverized during the rotation process. Only solid materials such as metals, glass and wood leave the screen drum. The pulverized carbon material falls through the screen and is collected in the metal drum below.

As described more fully in my U.S. Pat. No. 3,961,025 the carbonization process produces flammable distilled gases which may be washed and used to heat the carbonizing drum. The metals, glass and wood falling out of the screen drum are brought to a separator and separated using known processes. The carbon-catalyst powder is then collected into containers and shipped to a central plant. There, the carbon may be used as a basic material for the manufacture of other chemical products. This can be done in either of two ways:

(a) The carbon-catalyst is burned and the carbon monoxide obtained during this process can be used to produce synthetic gasoline.

(b) The catalyst is brought back into solution. Through filtration, the carbon is separated from the catalyst and stored for further use. This carbon can be used in many processes in both the chemical and manufacturing industries.

It is to be noted that the concentration of the alkali metal aluminate in the sludge solution is not critical; but an amount thereof should be present sufficient to (1) combine with the cellulose-containing waste and (2) carbonize the substance at a selected temperature to which the mixture is destined to be heated. Typically, the concentration of the alkali metal aluminate sludge-solution ranges from about 1 weight percent of the alkali metal aluminate to saturation of the solution at a particular temperature. A suitable temperature typically ranges from 50° C. to the boiling point of the carbonizing catalyst solution, however, room temperature may be also used (at atmosphere of pressure or above).

The chemical formula for sodium aluminate is usually expressed as $NaAlO_2$ (sodium meta aluminate) in the Handbook of Chemistry and Physics or as $Na_2Al_2O_4$ in industrial technical data. It is most commonly available in liquid form and as the granular trihydrate $Na_2O.Al_2O_3.3H_2O$. The stability and reactivity of sodium aluminate solutions are dependent, to a large extent, on the $Na_2O/Al_2O_3$ molecular ratio. When added to the sewage sludge-municipal solid waste mixture, it may happen that its solubility in water after carbonization is decreased. This decrease in solubility may occur because of the various salts contained in the sewage sludge-municipal solid waste and its processing.

EXAMPLE I

To 500 grams of mostly cellulose-containing municipal solid waste of the following composition:
297 grams of paper, cardboard, etc.
140 grams of meat, bread, apples, leaves and grass,
63 grams of a variety of plastics,
were added (in water solution) 10 grams of sodium aluminate ($Na_2OAl_2O_3.3H_2O$). The waste was mixed thoroughly with the sodium aluminate and afterwards dried. The dried municipal solid waste was next mixed with 500 grams by weight raw sewage sludge containing about 5% of solids. The mixture of municipal solid waste and sludge was placed in a rotary carbonizing drum and carbonized. The carbonizing conditions were as follows:
The periphery (rotary) speed of the carbonizing drum was 1.8 inches per second. The temperature at the front and the rear of the drum was 227° C. and in the center 249° C. The carbonizing time was 60 minutes.

The development of pyrolysis gases began when the drum reached the desired temperature (3 minutes). During the first 25 minutes, a pilot flame helped to burn the pyrolysis gases; later, the burning of the pyrolysis gases was self-sustained. The carbon obtained was 150 grams.

During all experiments, small pieces of metal were placed into the carbonizing drum to ensure better grinding of the formed carbon.

EXAMPLE II

In this example the amount of raw sewage sludge and the composition of cellulose-containing municipal solid waste were the same as in Example I. However, the 10 grams of sodium aluminate (in solution form) were added to the raw sludge and stirred rather than adding the sodium aluminate to the municipal solid waste. Afterwards, 500 grams of untreated municipal solid waste were added to, and thoroughly mixed with the treated sludge and brought into the carbonizing drum. The carbonizing conditions were the same as in example I. The pyrolysis gas development and the amount of carbon obtained were the same as in example I.

EXAMPLE III

To 500 grams of raw sludge, 15 grams of raw carbon priorly obtained from the carbonization of municipal solid waste, was added and thoroughly mixed. This carbon contained between 4–6% of sodium aluminate and its compounds (aluminum hydroxide and sodium hydroxide). A thickening of the sludge was observed. In addition, 5 grams (1%) of sodium aluminate were added. The 520 grams of the sludge were mixed thoroughly with 500 grams of municipal solid waste of following composition:
250 grams of paper, cardboard, etc.
180 grams of meat, bread, vegetables, leaves and grass.
70 grams of a variety of plastics.
The mixture was brought into carbonizing drum and carbonized using the carbonizing conditions of example I. However, during the process of carbonization (35 minutes), the drum was opened and the carbonizing product inspected. The sludge and municipal solid waste were found to be carbonized, however, the carbonized material still contained tar and pyrolysis gases. After inspection, the drum was closed and the carbonizing process continued. 25 minutes later, the carbonization was stopped and the carbon product weighed at 164 grams. The pyrolysis gases developed burned very well.

EXAMPLE IV

Into 1,000 grams of raw sewage sludge, 50 grams of raw carbon obtained from carbonizing processes described in examples I and II, were added and thoroughly mixed. The carbon contained from 4–6% of sodium aluminate and its compounds.

Immediately, without opportunity for settling, the sludge was brought into the rotary carbonizing drum and carbonized at a temperature of 210° C. To begin the pyrolysis process, water vapor was provided and condensed at the end of the burner. The developed pyrolysis gases burned initially with the help of a pilot flame but after 35 minutes, the burning of the gases was self-sustaining. The recovered carbon weighed 54 grams.

EXAMPLE V

After decomposition in the digesters and greenhouse drying, 1000 grams sludge-residue were placed in the rotary carbonizing drum and carbonized under the following conditions:

Temperature 177° C.; Time 50 minutes.

Initially, a mixture of gases and water was observed, however, as the carbonization process proceeded the quality of the pyrolysis gases improved and after 35 minutes burning of the gases became self-sustaining. The odor developed during carbonization was strong and not observed when sludge and municipal solid waste were carbonized together. The amount of carbon was not determined, because the sludge was contaminated with sand and gravel from the green house. The above sludge was treated with aluminum chloride and a polymer during the processing to obtain a better settling of the solids.

EXAMPLE VI 1000 grams of raw sewage sludge containing 5% of solids was thoroughly mixed with 50 grams of raw carbon containing 4–6% of sodium aluminate, and its compounds. Into this sludge, 500 grams of cellulose-containg municipal solid waste, of the composition described in example I, and treated with 10 grams of sodium aluminate, was added and thoroughly mixed. The sludge was put aside for 2 hours and settling of the solids was observed. Excess of water was removed from the mixture by means of a cloth filter and the mixture was then placed wet into the carbonizing drum. The sludge solids adhered very well to the cellulose waste.

The carbonizing temperature was 232° C. The carbonizing time was 60 minutes. To begin the process, gases and water vapor was formed which were burned with help of a pilot flame. After 23 minutes the burning of the pyrolysis gases occurred in a self-sustained manner. The amount of carbon obtained was 198 grams.

EXAMPLE VII

Into 1500 grams of heated-to-80° C. raw sewage sludge containing an excess of 8% of solids were added 90 grams of raw carbon, produced in the previously described examples, and the mixture thoroughly mixed. The carbon contained a sodium aluminate and its compounds. In addition 6 grams of sodium aluminate were added. The sludge was then mixed with 500 grams of waste, as described in example I. The solids contained in the sludge adhered very well to the waste. Afterwards, the mixture was dewatered and dried, then placed into the carbonizing drum and carbonized.

The development of pyrolysis gases was extensive so that it was necessary to lower the temperature from 256° C. to 225° C. Burning of the gases became self-sustaining after 23 minutes. The amount of carbon obtained was 239 grams.

EXAMPLE VIII

In this example, the amount of raw sewage sludge and the composition of cellulose-containing municipal solid waste, were the same as described in example I. The temperature was 245° C., and the carbonizing time 60 minutes. However, oxygen containing ambient was introduced into the closed rotary carbonizing drum. Most of the time a pilot flame helped to burn the pyrolysis gases. The carbon obtained weighed 138 grams.

What I claim is:

1. A method of carbonizing cellulose-containing waste material and sewage sludge, which comprises:
   combining sewage sludge containing from 4% to 7% solids with an alkali metal meta aluminate of a concentration ranging from 1% to 20% by weight based on said sewage sludge;
   combining the cellulose-containing waste material with the sludge-aluminate mixture; and then
   heating said carbonizing mixture to carbonize at least the cellulose-containing waste material in a closed system at a temperature ranging from 175° C. to 700° C.

2. The method according to claim 1 wherein said alkali metal meta aluminate comprises sodium aluminate.

3. The method according to claim 1 including the further step of adding raw carbon containing alkali metal aluminate, aluminum hydroxide and sodium hydroxide to the sludge, prior to the alkali metal meta aluminate combining step.

4. The process according to claim 1 including the further step of terminating the carbonizing process while the tars and pyrolysis gases are still contained in the carbonized material.

5. A wet method of carbonizing a cellulose-containing substance without ignition thereof, which comprises:
   treating the substance with a mixture of raw sewage sludge containing from 4% to 7% solids and a catalyst comprising a dissolved alkali metal meta aluminate of a concentration ranging from 1% to 20% by weight based on said sewage sludge;
   heating said treated substance until said treated substance is carbonized in a closed system at a temperature ranging from 175° C. to 700° C.

6. The method as defined in claim 5 wherein said alkali metal aluminate comprises sodium meta aluminate.

7. A method for treating solid waste material containing cellulose in a closed system
   treating the solid waste material with sewage sludge having from 4% to 7% solids and a dissolved alkali metal meta aluminate of a concentration ranging from 1% to 20% by weight based on said sewage sludge;
   heating said treated solid waste material to carbonize the material comprising cellulose to form carbon at a temperature ranging from 175° C. to 700° C.; and
   separating said formed carbon from remaining solid waste material.

8. The method as defined in claim 7 which further comprises heating said formed carbon in air to form a gaseous oxidation product.

9. The method as defined in claim 7 wherein said alkali metal meta aluminate comprises sodium aluminate.

10. A process for treating both cellulose-containing municipal solid waste and municipal/industrial sewage, which comprises:
   a. chopping-up the solids in said sewage in a screening chamber to reduce the size of the solids;
   b. removing any sand, grit or abrasive present in the chopped-up sewage in a Parshall flume and grit chamber;
   c. flowing the sewage from the Parshall and grit chamber in a primary clarifier to remove solids and greases in the sewage by settling;
   d. flowing the effluent from the primary clarifier into bio-filter and later into a secondary clarifier to remove by settling substantially all remaining solids;

e. filtering the effluent from the secondary clarifier in a carbon filter;
f. killing any bacteria in the effluent by contacting the same with liquid chlorine, or the like;
g. adding a water soluble alkali metal meta aluminate to said remaining solids to obtain a concentration ranging from 1% to 20% by weight based on said sewage sludge;
h. placing the cellulose-containing municipal solid waste in a screened basket;
i. dipping said basket into the sewage-aluminate mixture to intimately contact and soak the waste with the aluminate-sewage mixture;
j. removing the excess sewage-aluminate mixture from said basket;
k. heating the dry or partially dry mixture to carbonize the solid waste and intermixed sewage in a closed system at a temperature ranging from 175° C. to 700° C.

11. The process according to claim 10 including the further step of adding raw carbon to the sewage subsequent to the sand and grit removing step.

12. A process of treating cellulose-containing municipal solid waste, which comprises:
combining an alkali metal meta aluminate with said cellulose-containing waste;
mixing with said combined waste and metal aluminate, raw sewage sludge containing from 4 to 7% solid material, said alkali metal meta aluminate being combined at a concentration ranging from 1% to 20% by weight based on said raw sewage sludge; and then
carbonizing the mixture at a temperature of from 175° C. to 700° C. in a closed system.

13. The process according to claim 12 wherein said alkali metal meta aluminate is sodium aluminate in 2% solution, said sewage sludge contains 5% solid material and is mixed with said aluminate treated waste in the ratio 1:1.

14. A process for treating municipal solid waste and raw sewage sludge with a dissolved alkali metal meta aluminate, which comprises:
decomposing said sludge in a digester;
drying said digested sludge in a greenhouse;
combining the dried sludge and cellulose-containing municipal solid waste with said dissolved alkali metal meta aluminate at a concentration ranging from 1% to 20% by weight based on said sewage sludge; and then
carbonizing the mixture in a furnace at a temperature of from 175° C. to 700° C.

* * * * *